United States Patent
Hsu

(10) Patent No.: US 8,913,181 B2
(45) Date of Patent: Dec. 16, 2014

(54) CAMERA MODULE AND METHOD FOR ASSEMBLING SAME

(75) Inventor: Hsin-Yen Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 273 days.

(21) Appl. No.: 13/368,231

(22) Filed: Feb. 7, 2012

(65) Prior Publication Data
US 2013/0063655 A1 Mar. 14, 2013

(30) Foreign Application Priority Data
Sep. 14, 2011 (TW) .................................. 100132948

(51) Int. Cl.
*H04N 5/225* (2006.01)
*G02B 7/02* (2006.01)
*G03B 43/00* (2006.01)
*H01L 31/0203* (2014.01)

(52) U.S. Cl.
CPC .............. *G02B 7/021* (2013.01); *H04N 5/2254* (2013.01); *H04N 5/2257* (2013.01); *G02B 7/025* (2013.01); *G03B 43/00* (2013.01)
USPC ............................. 348/374; 250/239; 257/433

(58) Field of Classification Search
USPC .................... 348/374; 250/239; 257/433–434
See application file for complete search history.

(56) References Cited

U.S. PATENT DOCUMENTS

| | | | | |
|---|---|---|---|---|
| 6,480,346 | B2* | 11/2002 | Funakoshi | 359/808 |
| 7,333,147 | B2* | 2/2008 | Adachi et al. | 348/374 |
| 7,515,203 | B2* | 4/2009 | Sato et al. | 348/374 |
| 7,763,855 | B2* | 7/2010 | Hayashi et al. | 250/339.01 |
| 7,983,556 | B2* | 7/2011 | Westerweck et al. | 396/535 |
| 8,493,504 | B2* | 7/2013 | Kobayashi et al. | 348/373 |

* cited by examiner

*Primary Examiner* — Ngoc-Yen Vu
(74) *Attorney, Agent, or Firm* — Novak Druce Connolly Bove + Quigg LLP

(57) ABSTRACT

In a method for assembling a camera module, a sensor module, a lens holder, and a lens assembly are first provided. The sensor module includes a substrate and a sensor positioned on the substrate. The lens holder is positioned on the substrate and accommodates the sensor. The lens assembly is held in the lens holder. At least one of the lens holder and the lens assembly has a chamfer at an end thereof opposite to the substrate and located between the lens holder and the lens assembly. Then, curable adhesive is applied to the chamfer. The tilt of the lens is adjusted until the lens assembly is optically aligned with the sensor. The curable adhesive is cured.

10 Claims, 8 Drawing Sheets

CAMERA MODULE AND METHOD FOR ASSEMBLING SAME

BACKGROUND

1. Technical Field

The present disclosure relates to camera modules and, particularly, to a method for assembling a camera module and the camera module that can increase image quality of the camera module.

2. Description of Related Art

Camera modules typically include a sensor module, a lens holder, and a lens. The sensor module includes a substrate and a sensor positioned on the substrate. The lens holder is positioned on the substrate, covering the sensor. The lens is held in the lens holder and is required to be aligned with the sensor to ensure high image quality of the camera module. However, being limited to manufacture and assembly precisions, the lens often tilts in relative to the sensor, degrading image quality of the camera module. To solve this problem, curable adhesive can be applied between the lens holder and the substrate, and the tilt of the lens holder is adjusted until the lens is aligned with the sensor, and then the curable adhesive is cured to fix the lens holder to the substrate to maintain the alignment between the lens and the sensor. However, the curable adhesive may change a focus state of the camera module as the curable adhesive changes the distance between the lens and the sensor which is typically designed, without taking account of the curable adhesive, to bring the camera module into the focus state.

Therefore, it is desirable to provide a method for assembling a camera module and a camera module, which can overcome the problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
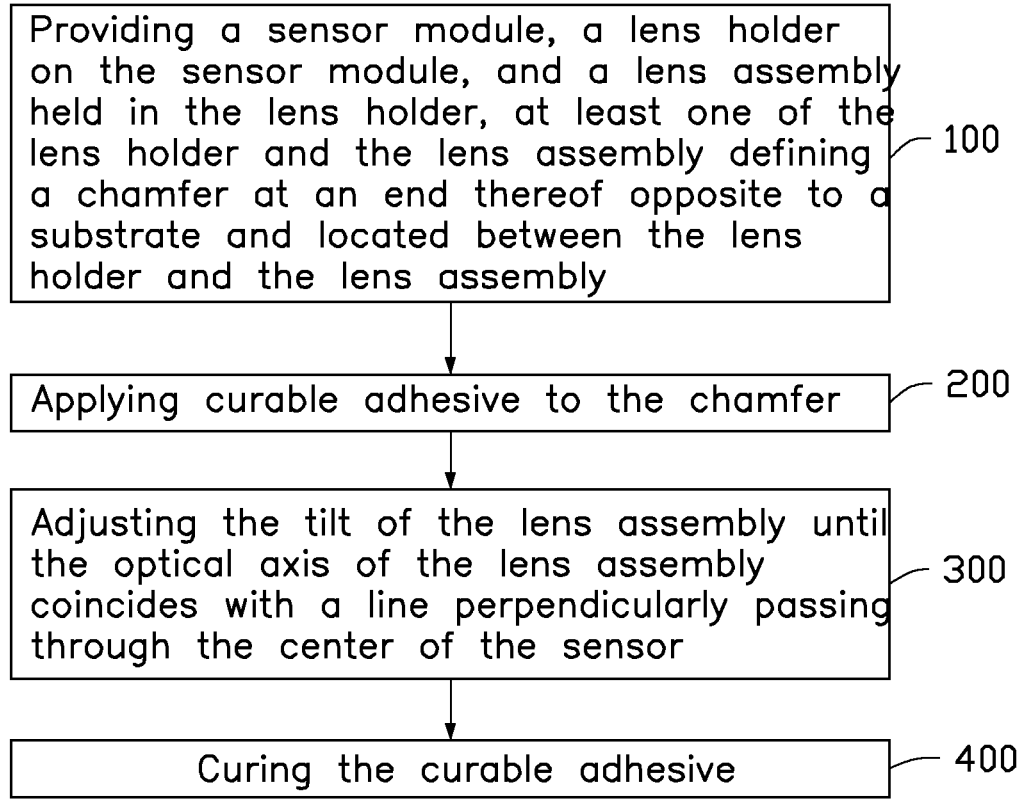
FIG. 1 is a flow chart of a method for assembling a camera module, according to a first embodiment.

Embodiments of the present disclosure will now be described in detail with reference to the drawing.

Figure 2:
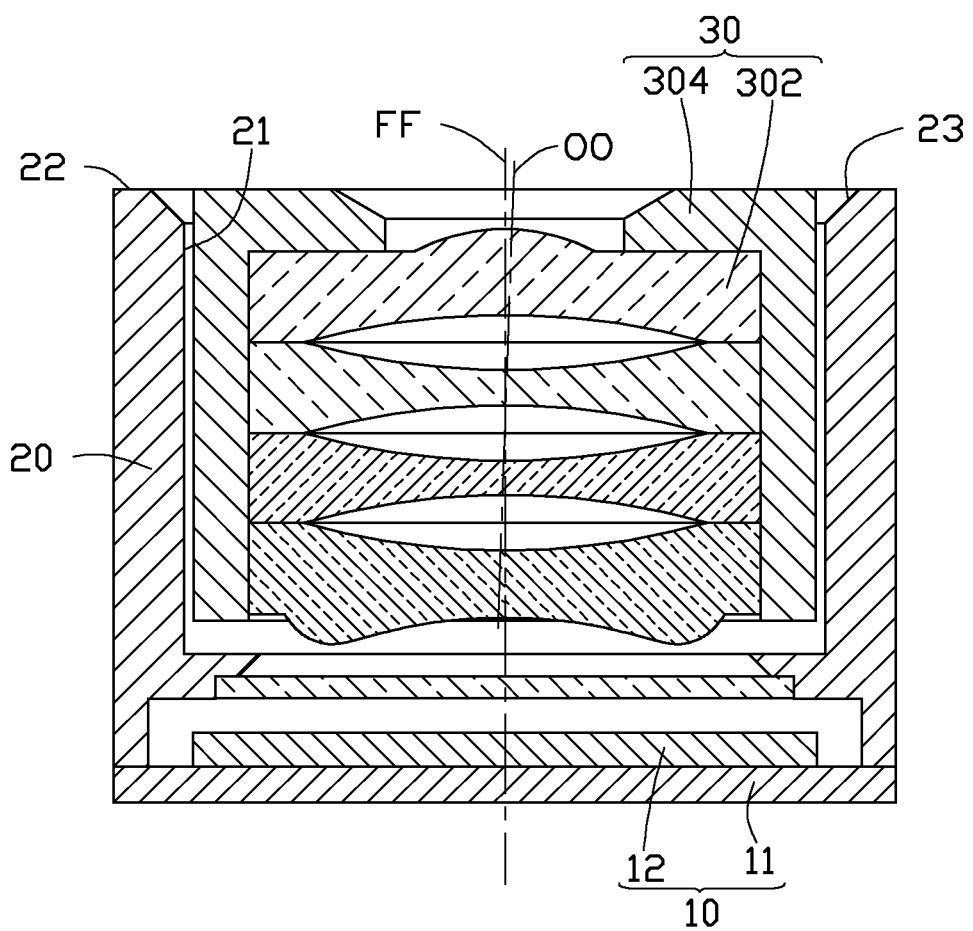
FIG. 2 is a cross-sectional schematic view of the camera module, which is in one step of the method of FIG. 1.

Referring to FIGS. 1-2, a method for assembling a camera module 500 (see FIG. 4), according to a first embodiment, includes the following steps 100-400.

In step 100, a sensor module 10, a lens holder 20, and a lens assembly 30 are provided. The sensor module 10 includes a substrate 11 and a sensor 12 positioned on the substrate 11. The lens holder 20 is positioned on the substrate 11, accommodating the sensor 12. The lens assembly 30 includes a plurality of lenses 302 and a lens barrel 304 accommodating the lenses 302 therein. The lens assembly 30 is held in the lens holder 20 such that the camera module 500 is focused. The lens assembly 30 can move along an optical axis OO thereof, and is allowed to tilt, in relative to the lens holder 20. The lens holder 20 is tubular and includes an inner circumferential surface 21 surrounding the lens assembly 30 and a first object-side end surface 22 perpendicularly connecting the inner circumferential surface 21 and facing away the substrate 11. The lens holder 20 defines a first chamfer 23 at an intersection between the inner circumferential surface 21 and the first object-side end surface 22.

Figure 3:
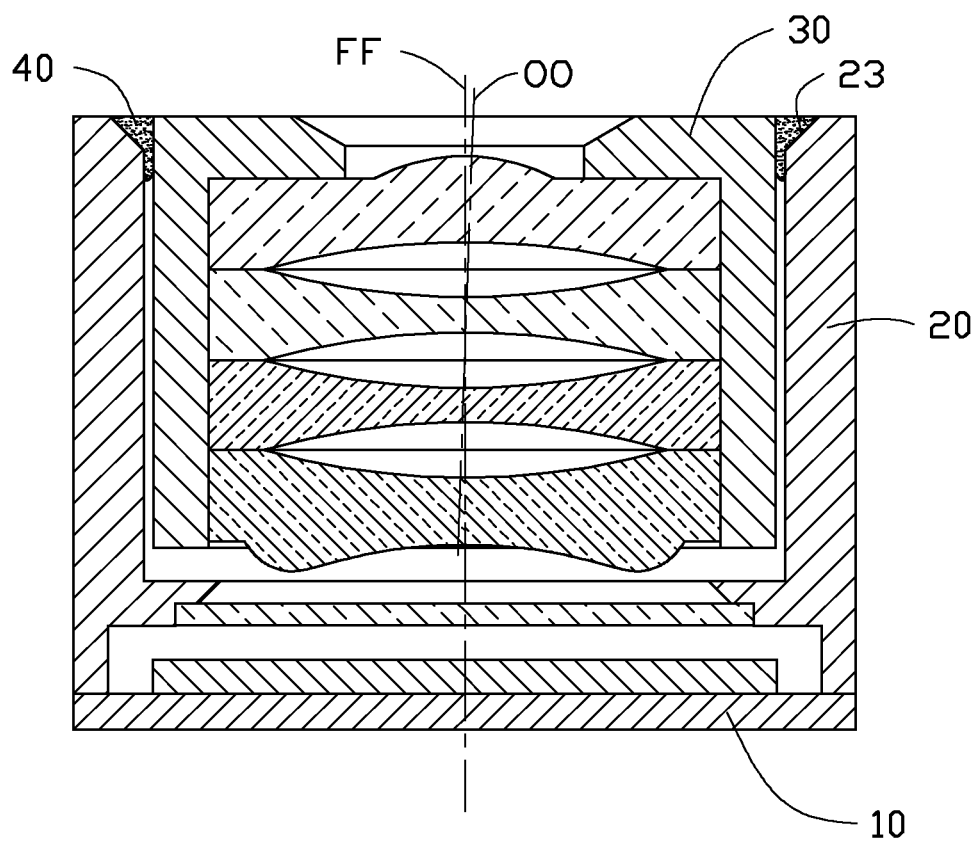
FIG. 3 is a cross-sectional schematic view of the camera module, which is in another step of the method of FIG. 1.

Also referring to FIG. 3, in step 200, a curable adhesive 40 is applied to the first chamfer 23 and retained between the lens holder 20 and the lens assembly 30.

Figure 4:
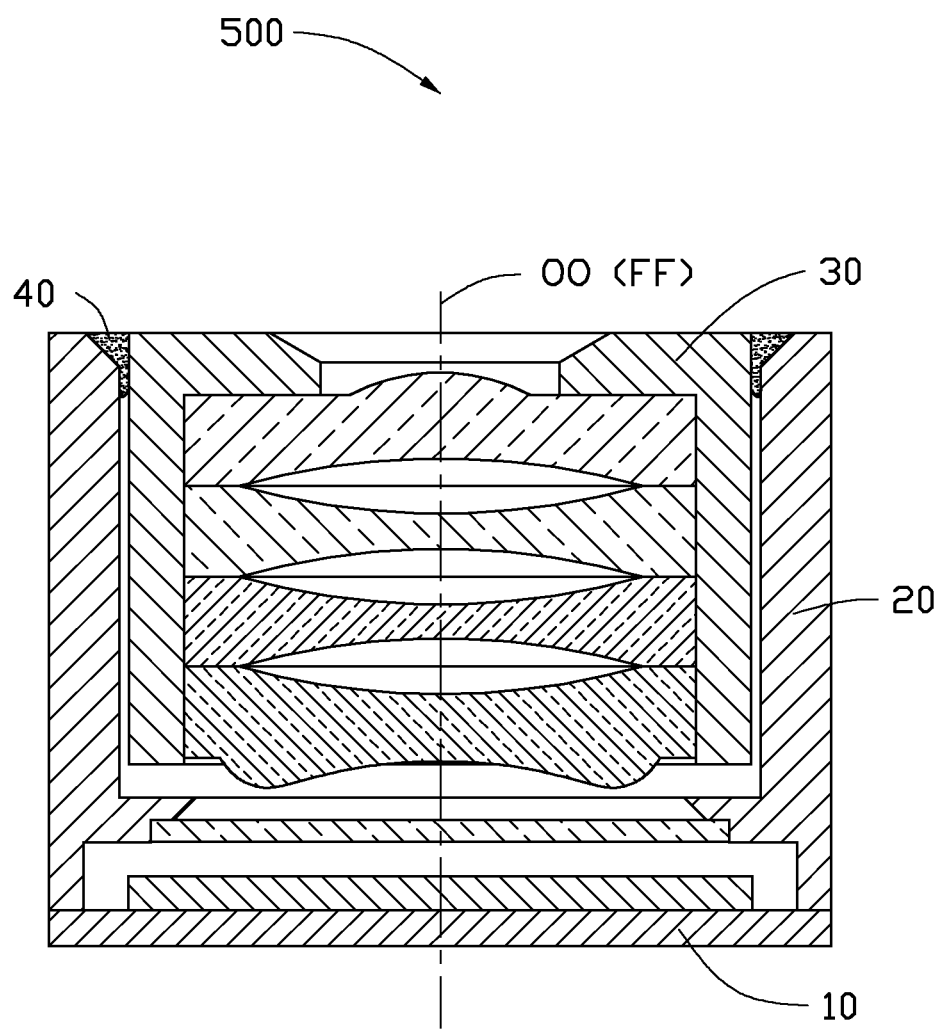
FIG. 4 is a cross-sectional schematic view of the camera module, assembled by the method of FIG. 1.

Also referring to FIG. 4, in step 300, the tilt of the lens assembly 30 is adjusted in relative to the lens holder 20 until the optical axis OO coincides with a line FF' which perpendicularly passes the center of the sensor 12, that is, the lens assembly 30 is aligned with the sensor 12. In detail, during the adjustment, the sensor 12 is controlled to capture images, and sharpness at the center and corners of each image is measured to determine whether or not the optical axis OO coincides with the line FF'. It can be determined that the optical axis OO coincides with the line FF' if the sharpness at the center and the corner of the image are substantially identical.

In step 400, the curable adhesive 40 is cured.

As such, the tilt of the lens assembly 30 can be eliminated while maintaining the camera module 500 in the focus state.

Figure 5:
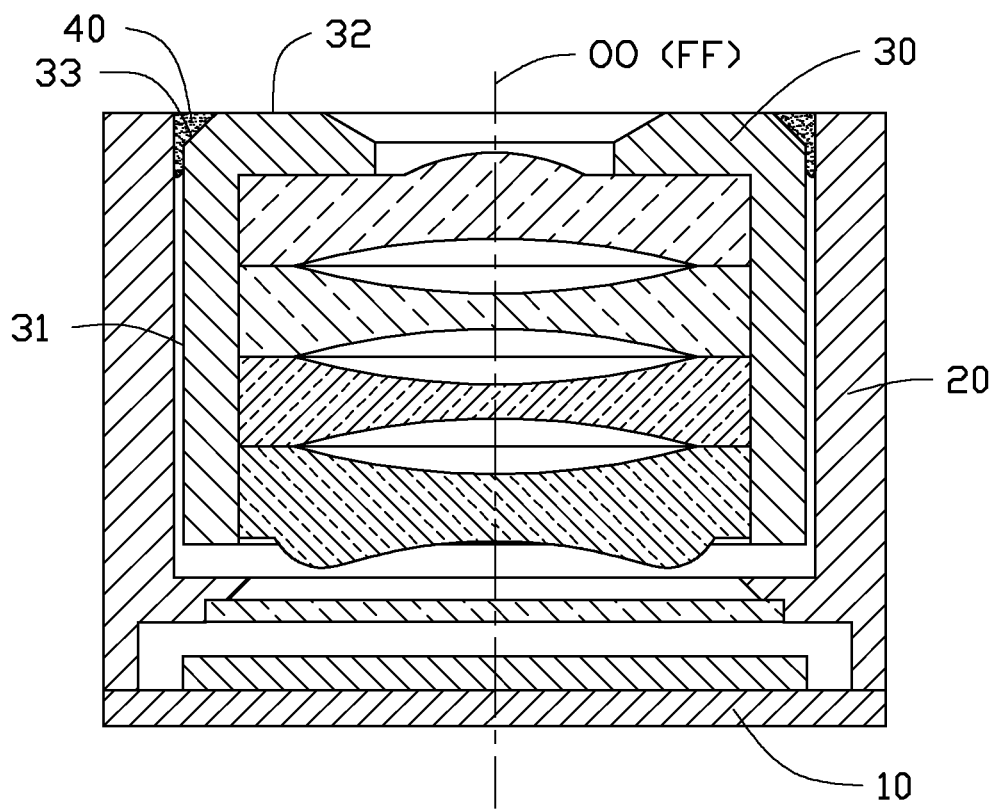
FIG. 5 is a cross-sectional schematic view of a camera module, according to a second embodiment.

Referring to FIG. 5, in a second embodiment, the lens holder 20 does not define the first chamfer 23. The lens assembly 30 includes an outer circumferential surface 31 facing the inner circumferential surface 21 and a second object-side end surface 32 perpendicularly connecting the outer circumferential surface 31 and facing away from the substrate 11. The lens assembly 30 defines a second chamfer 33 at an intersection between the outer circumferential surface 31 and the second object-side end surface 32. The curable adhesive 40 is applied to the second chamfer 33.

Figure 6:
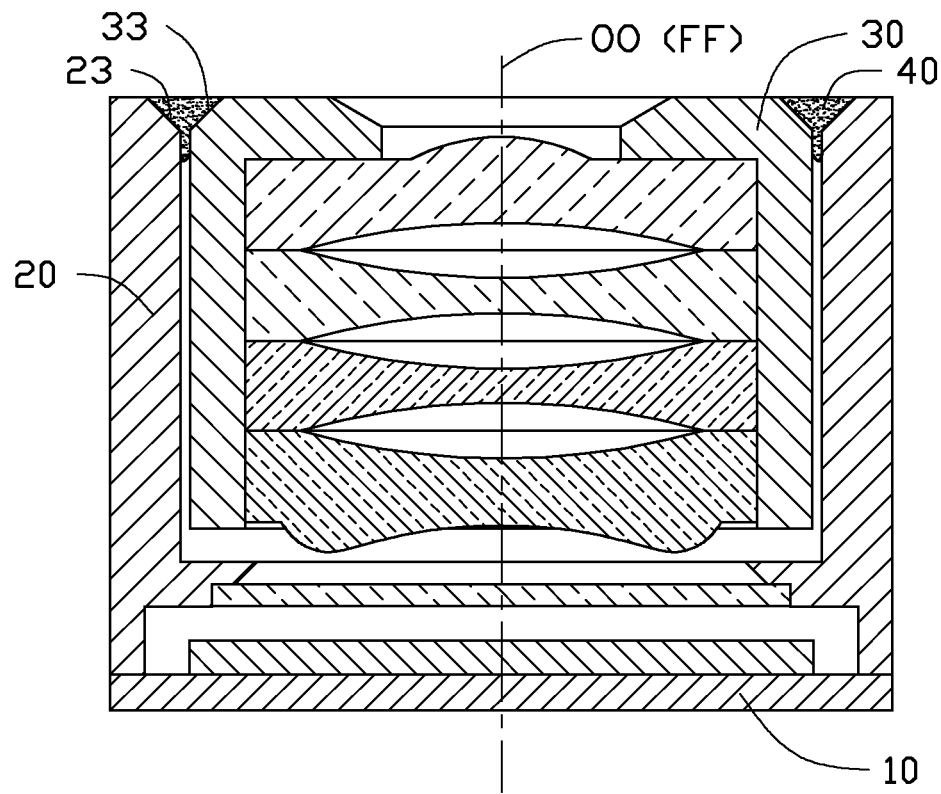
FIG. 6 is a cross-sectional schematic view of a camera module, according to a third embodiment.

Referring to FIG. 6, in a third embodiment, the lens holder 20 defines the first chamfer 23 and the lens defines a second chamfer 33. The curable adhesive 40 is applied to both the first chamfer 23 and the second chamber 33.

Provided that at least one of the lens holder 20 and the lens assembly 30 defines a chamfer (the first chamfer 23 or the second chamfer 33) at an end thereof opposite to the substrate 11 and located between the lens holder 20 and the lens assembly 30, the tilt of the lens assembly 30 can be adjusted without affecting the focus state of the camera module 500 by applying the curable adhesive to the chamfer before the adjustment of tilt and curing the curable adhesive 40 after the adjustment of the tilt.

Both the first chamfer 23 and the second chamfer 33 surround the lens assembly 30. However, only a few drops, for example, three or four drops, of the curable adhesive 40 can be applied to the chamfer 23 and/or the second chamfer 33 in step 200 to reduce adhesive force on the lens assembly 30 and thus facilitate the adjustment in step 300. Then, additional curable adhesive 40 can be further applied to fill up the first chamfer 23 and/or the second chamfer 33 after the step 400 and then is cured to increase binding power between the lens holder 20 and the lens assembly 30.

Figure 7:
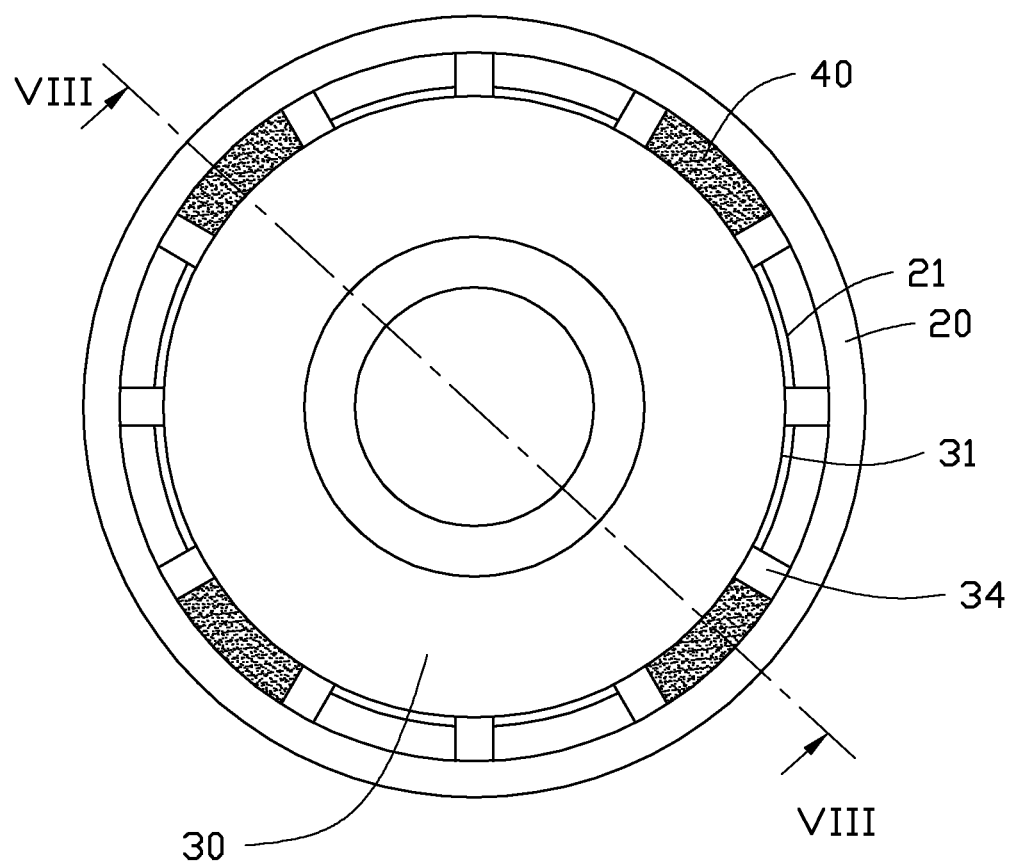
FIG. 7 is a top schematic view of a camera module, according to a fourth embodiment.
Figure 8:
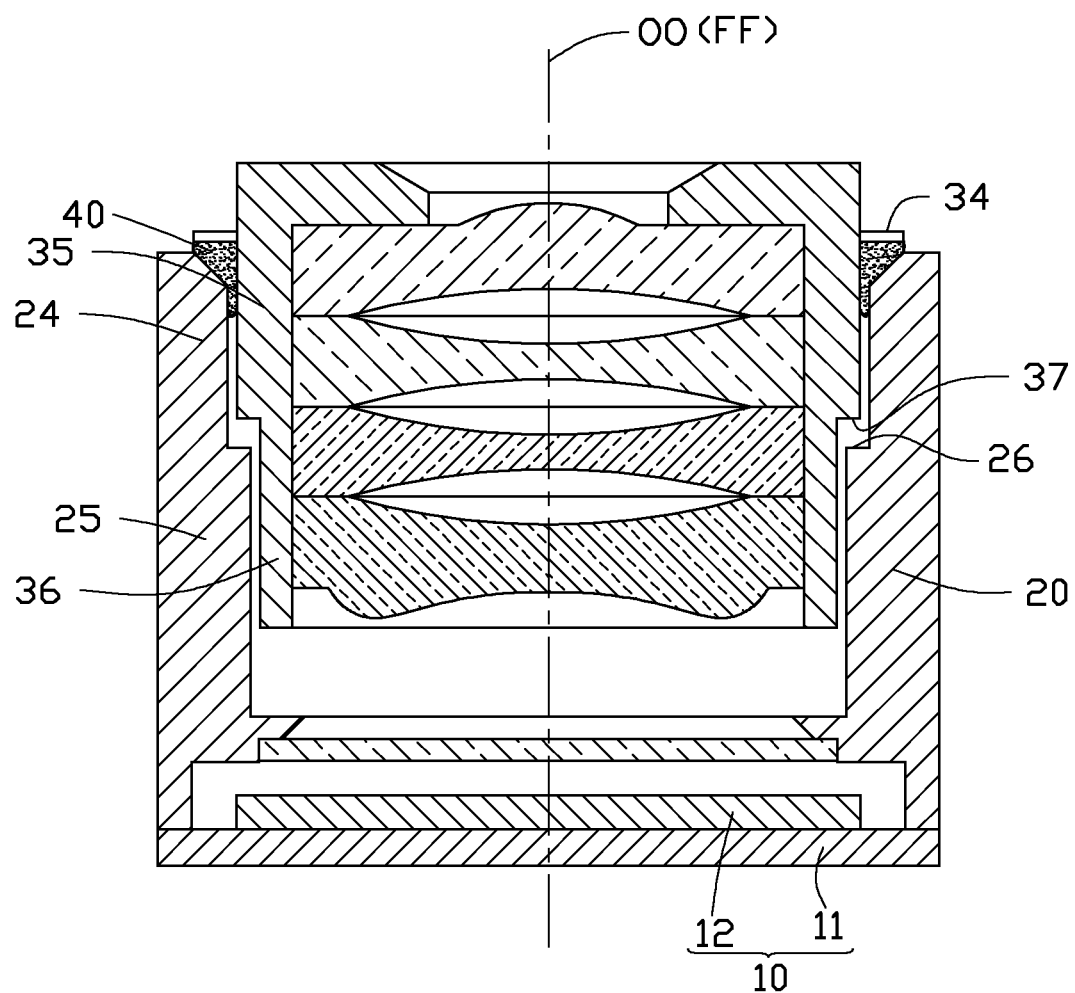
FIG. 8 is a cross-sectional schematic view taken along a line VIII-VIII of FIG. 7.

Referring to FIGS. 7-8, in a fourth embodiment, the lens assembly 30 extends up from the lens holder 20 from an end of the lens holder 20 opposite to the substrate 11 and includes a number of wings 34 extending from the outer circumferential surface 31 along radial directions of the lens assembly 30. Only the lens holder 20 defines the first chamfer 23. The wings 34 are coplanar with each other and positioned slightly above the first object-side end surface 22. The wings 34 can be equidistantly arranged around the outer circumferential surface 31. In step 200, the drops of the curable adhesive 40 are firstly applied to the chamfer 23 through gaps defined between the wings 34. After the step 400, additional curable adhesive 40 can be further filled up the first chamfer 23 until contacting with the wings 34. In this way, the binding power between the lens holder 20 and the lens assembly 30 can be increased.

The lens holder 20 can include a first object-side section 24 adjacent to the first object-side end surface 22 and a first image-side section 25 far from the first object-side end surface 22, and the inner diameter of the first object-side section 24 is greater than that of the first image-side section 25, thereby forming a first step surface 26 facing away from the substrate 11. The lens assembly 30 includes a second object-side section 35 adjacent to the second object-side surface 32 and a second image-side section 36 far from the second object-side end surface 32, and the outer diameter of the second object-side section 35 is greater than that of the second image-side section 36, thereby forming a second step surface 37 facing the substrate 11. The outer diameter of the second object-side section 36 is also greater than the inner diameter of the first image-side section 25 and, as such, the inner circumferential surface 21, the first step surface 25, the outer circumferential surface 31, and the second step surface 366 cooperatively define a zigzag channel which can effectively block light rays leakage to the sensor 12.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A method for assembling a camera module, comprising:
providing a sensor module, a lens holder, and a lens assembly, the sensor module comprising a substrate and a sensor positioned on the substrate, the lens holder being positioned on the substrate and accommodating the sensor, the lens assembly being held in the lens holder such that the camera module is focused, the lens assembly being capable of moving along an optical axis thereof and allowed to tilt relative to the lens holder, at least one of the lens holder and the lens assembly having a chamfer at an end thereof opposite to the substrate and located between the lens holder and the lens assembly;
applying curable adhesive to the chamfer;
adjusting the tilt of the lens assembly until the optical axis of the lens assembly coincides with a line perpendicularly passing through the center of the sensor; and
curing the curable adhesive.

2. The method of claim 1, wherein only a few drops of the curable adhesive are applied to the chamfer in the step of applying curable adhesive to the chamfer.

3. The method of claim 2, further comprising:
filling up the chamfer with additional curable adhesive after the step of curing the curable adhesive; and
curing the additional curable adhesive.

4. The method of claim 1, wherein the lens holder is tubular and comprises an inner circumferential surface surrounding the lens assembly and a first object-side end surface perpendicularly connecting the inner circumferential surface and facing away the substrate, and the chamfer is positioned at an intersection between the inner circumferential surface and the first object-side end surface.

5. The method of claim 4, wherein the lens assembly comprises an outer circumferential surface, the lens assembly partially extends out of the lens holder from an end of the lens holder opposite to the substrate and comprises a plurality of wings extending from the outer circumferential surface along its radial directions, the wings are coplanar with each other and located slightly above the lens holder, only a plurality drops of the curable adhesive are applied to the chamfer through gaps between the wings in the step of applying curable adhesive to the chamfer, and the method further comprises:
filling the chamfer with additional curable adhesive until the additional curable adhesive contacts with the wings after the step of curing the curable adhesive; and
curing the additional curable adhesive.

6. The method of claim 1, wherein the lens assembly comprises an outer circumferential surface facing the lens holder and a second object-side end surface perpendicularly connecting the outer circumferential surface and opposite to the substrate, and the chamfer is positioned at an intersection between the outer circumferential surface and the second object-side end surface.

7. The method of claim 1, wherein the lens holder is tubular and comprises an inner circumferential surface surrounding the lens assembly and a first object-side end surface perpendicularly connecting the inner circumferential surface and facing away the substrate, the lens assembly comprises an outer circumferential surface facing the inner circumferential surface and a second object-side end surface perpendicularly connecting the outer circumferential surface and opposite to the substrate, each of the lens holder and the lens assembly has the chamfer, the chamfer of the lens holder is positioned at an intersection between the inner circumferential surface and the first object-side end surface, and the chamfer of the lens assembly is positioned at an intersection between the outer circumferential surface and the second object-side end surface.

8. The method of claim 1, wherein the lens holder comprises a first object-side section adjacent to an object side of the camera module and a first image-side section adjacent to an image side of the camera module, the inner diameter of the first object-side section is greater than that of the first image-side section, thereby forming a first step surface on an inner circumferential surface thereof and facing away from the substrate, the lens assembly comprises a second object-side section adjacent to the object side of the camera module and a second image-side section adjacent to the image side of the camera module, the outer diameter of the second object-side section is greater that of the second image-side section, thereby forming a second step surface on an outer circumferential surface thereof and facing the substrate, and the outer diameter of the second object-side section is also greater than the inner diameter of the first image-side section.

9. A camera module, comprising:
a sensor module comprising a substrate and a sensor positioned on the substrate;
a lens holder positioned on the substrate and accommodating the sensor;

a lens assembly held in the lens holder, at least one of the lens holder and the lens assembly having a chamfer at an end thereof opposite to the substrate and located between the lens holder and the lens assembly, the chamfer having a surface sloped from the end toward the substrate; and adhesive positioned on the chamfer and between the lens holder and the lens assembly wherein the lens holder is tubular and comprises an inner circumferential surface surrounding the lens assembly and a first object-side end surface perpendicularly connecting the inner circumferential surface and facing away the substrate, and the chamfer is positioned at an intersection between the inner circumferential surface and the first object-side end surface; the lens assembly comprises an outer circumferential surface, the lens assembly partially extends out of the lens holder from an end of the lens holder opposite to the substrate and comprises a plurality of wings extending from the outer circumferential surface along its radial directions, the wings are coplanar with each other and located slightly above the lens holder, the adhesive fills up the chamfer and contacts with the wings.

10. A camera module comprising:

a sensor module comprising a substrate and a sensor positioned on the substrate;

a lens holder positioned on the substrate and accommodating the sensor;

a lens assembly held in the lens holder, at least one of the lens holder and the lens assembly having a chamfer at an end thereof opposite to the substrate and located between the lens holder and the lens assembly, the chamfer having a surface sloped from the end toward the substrate; and adhesive positioned on the chamfer and between the lens holder and the lens assembly;

wherein the lens assembly comprises an outer circumferential surface facing the lens holder and a second object-side end surface perpendicularly connecting the outer circumferential surface and opposite to the substrate, and the chamfer is positioned at an intersection between the outer circumferential surface and the second object-side end surface.

\* \* \* \* \*